Patented July 17, 1934

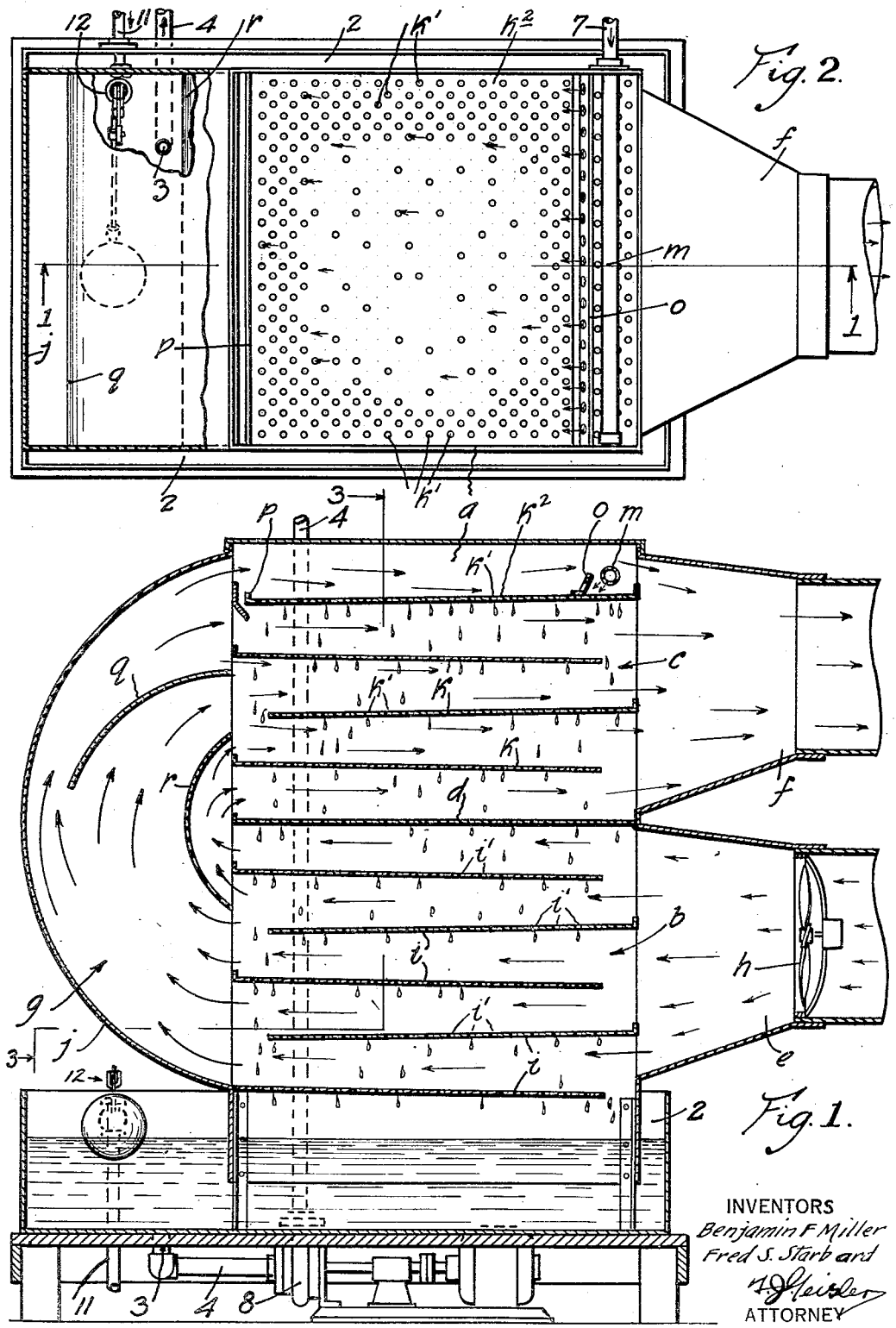

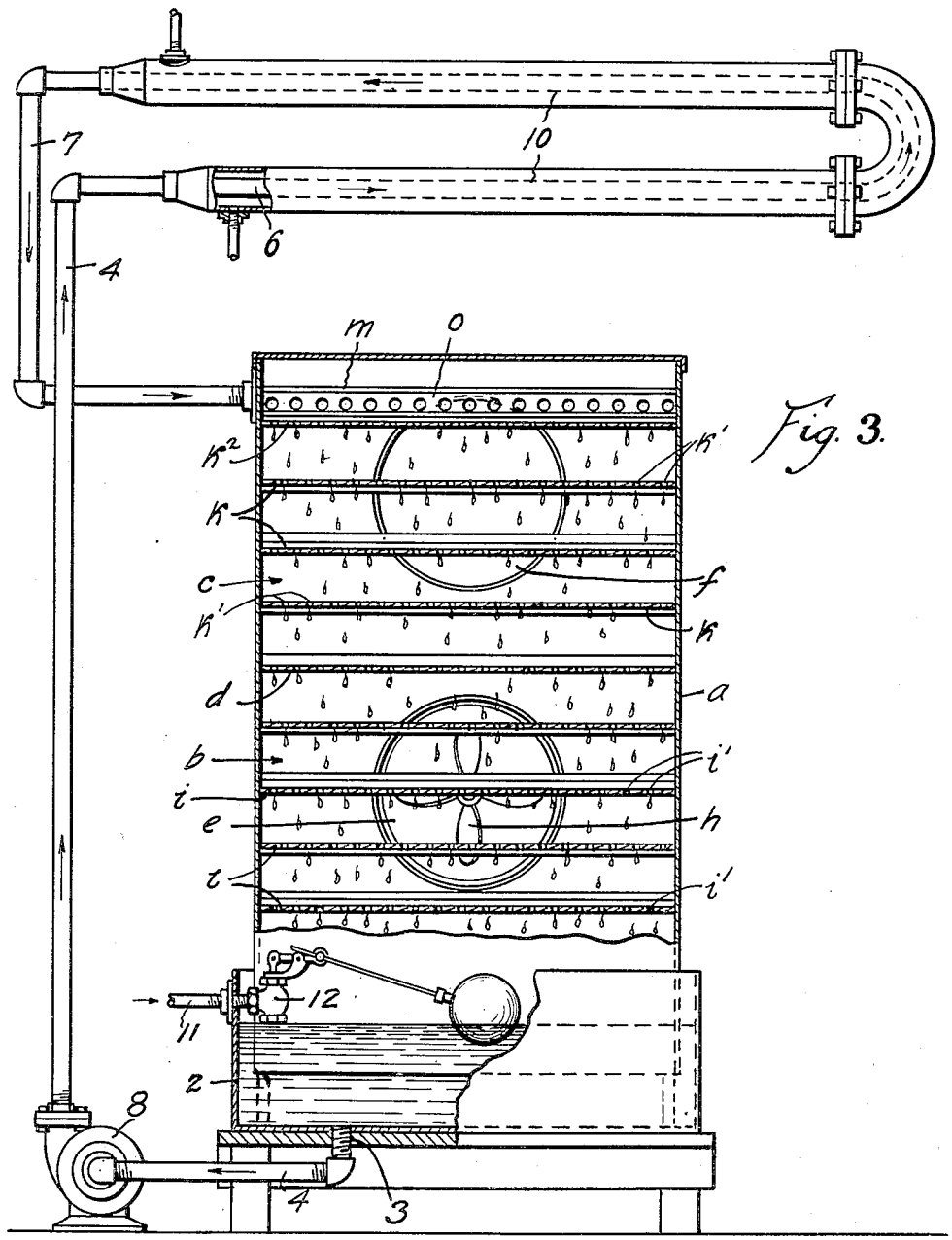

1,966,802

UNITED STATES PATENT OFFICE 1,966,802

AIR AND WATER COOLING APPARATUS

Benjamin F. Miller and Fred S. Starbard, Portland, Oreg., assignors of one-third to Charles O. Purdin, Portland, Oreg.

Application October 23, 1931, Serial No. 570,666

3 Claims. (Cl. 261—113)

Our invention relates to an air and water cooling apparatus.

The object of our invention is to employ for domestic or commercial purposes a current of air in combination with a shower of liquid, specifically water, in order to raise or lower the temperature of one relatively to the other.

One example of the proposed use of our invention is to cool the water, used as a cooling medium for condensing coils of a refrigerating plant and the like, in order that the water may be recirculated and thus not wasted. To allow the water used for such purpose to waste into the sewer is too expensive to be practical.

For this purpose open air cooling towers have been used in which water is allowed to flow over pipes carrying the medium to be cooled, but they occupy considerable space and are located out of doors, and thus are affected by seasonal temperatures, in the summer time on a very hot day the efficiency of the cooling tower is reduced, and in cold weather, the water freezes and the tower becomes inoperative.

A further example of the use of our invention is to provide for the efficient and economical cooling and washing of the air in the ventilating system of a building or manufacturing plant.

In both the above examples, the water is introduced into the apparatus in the form of a fine shower. In the case of the cooling tower, the evaporation is excessive and in a ventilating system, the fine particles of water are carried away by the air currents to the room being ventilated, where undesirable condensation takes place. In both instances, the loss of water is considerable and adds materially to the cost of operation.

Therefore a further object of our invention is to provide a compact and highly efficient cooling apparatus which will occupy but relatively little space so that it may be located inside a building and thus protected from the effect of atmospheric conditions; also adapted to permit the air to be driven therethrough without undue resistance, tending to cut down the efficiency of the apparatus.

A further object of our invention is to provide an air or water cooling apparatus adapted to recirculate the water used as a cooling medium and thereby save the water from being wasted; and through which the water is conducted in relatively large streams in the form of a coarse shower, thereby to prevent excessive evaporation and the particles of water from being carried away by the currents of air.

We attain our objects in a cooling apparatus comprising a chamber having an inlet and an outlet, and means for blowing air thru the chamber, a stack of perforated pans adapted and staggered to cause the overlying pans to discharge at their ends on the underlying pans, and means for discharging a stream of liquid on the upper pan, whereby the liquid is divided into thin sheets flowing over said pans respectively, and into a large number of small streams percolating thru the perforations of said pans, and thus a more intimate contact between the liquid and the air is obtained for adjusting the temperature of one relatively to the other.

These and other incidental features of our invention, the details of construction and mode of operation are hereinafter diagrammatically illustrated with reference to the accompanying drawings.

In the drawings:

Fig. 1 shows a vertical section taken on the line 1—1 of Fig. 2 and illustrates the relative arrangement of the chambers and baffle plates of my cooling apparatus; also the passageway connecting the said chambers;

Fig. 2 shows a plan view of our apparatus with the top removed and parts broken away to disclose further details of construction;

Fig. 3 shows a vertical section taken on the line 3—3 of Fig. 2 and illustrates diagrammatically how our cooling apparatus is connected with the condensing coils of a refrigerating plant or the like.

Referring to Figs. 1, 2 and 3: Our cooling apparatus comprises a housing $a$ divided into chambers $b$, $c$ by a perforated partition $d$. The chambers $b$, $c$ are provided with an air inlet $e$ and outlet $f$, respectively, located on the same side of the housing and of substantial and equal cross section.

A fan or blower $h$ is provided in the inlet $e$ and the opposite ends of the chambers $b$, $c$ are connected by a passageway $g$.

The wall $j$ of the passageway $g$ is curved about a horizontal axis on a radius of substantial length thus deflecting the current of air striking against the said curved surface at an angle equal to its angle of incidence around the partition $d$ to the compartment $c$ without undue resistance. That is the current of air is not thrown back towards the blower $h$ as would be the case were the wall $j$ arranged substantially at right angles to the inlet $e$. Curved director plates $q$, $r$ are also provided in the passageway $g$ to distribute the air uniformly through the compartment $c$ and prevent it from traveling along the exterior wall $j$ of the passageway $g$ as it would otherwise in following the line of least resistance. The director plate $q$ is secured to the inlet of the chamber $c$ and extends therefrom in approximately 90 degrees of arc, so as to intercept the air blast as it leaves the chamber $b$ and thus directs a portion of the air over the lower pans.

A series of alternately arranged pans $i$, having perforations $i'$, $k'$ of substantial diameter, are provided, respectively, in the chambers $b$, $c$ which divide the said chambers into a plurality of parallel passageways. The perforated pans $i$, $k$ are staggered and slightly inclined so as to discharge from one to the other. A spreader pipe $m$, connected to a source of water is located above the uppermost pan $k2$, the latter being provided with a perforated dam $o$ adjacent the spray pipe $m$, and the opposite end of the pan $k2$ is also provided with an upturned lip $p$ whereby to retard the flow of water over said pans and cause the sheet of water carried thereby to be maintained at a minimum depth notwithstanding the dropping of part of the water thru the perforations of the pans. Thus the water is not only cooled by being brought into direct contact with the air, but also by flowing over the pans, which tend to absorb the heat from it.

When our cooling apparatus is to be used for cooling water, which has become heated from being used as a cooling medium, for example for the condensing coils 10 of a refrigerating plant, see Fig. 3, the bottom of the housing $a$ is provided with a water reservoir 2 having an outlet 3 connected by a pipe 4 to the cooling fluid passageways 6 of the said coils 10. The spreader pipe $m$ is connected to the outlet of the cooling fluid passageway 6 by a pipe 7 and a suitable pump 8 is provided in the pipe 4 for circulating the water through our cooling apparatus and the passageways 6 of the condensing coils.

A water supply pipe 11, connected to the water main, is provided in the reservoir 2 controlled by a float valve 12, whereby the level of water in the reservoir is maintained at a constant level, and thus losses through evaporation or other causes are replenished.

Of course, when our apparatus is to be used for washing and cooling the air of a ventilating system, the water is purified by auxiliary means and then returned to the cooling apparatus, such as by a return pipe, similar to pipe 4.

*Operation*

The operation of our apparatus is substantially the same whether used for cooling water with air, or the air with water, in either case the air entering the inlet $e$ passes over the pans $i$ around the partition $d$ and over the pans $k$ to the outlet and the water flowing through the perforation in and over the pans $i$, $k$ enters into intimate surface contact with the air, whereby the one having the lowest temperature absorbs the heat from the other. Thus, the water or the air is cooled and in the latter instance, also washed and cleaned.

Further, by providing perforations $i'$, $k'$ of substantial diameter, approximately one-fourth of an inch, in the pans $i$, $k$ the water passes through them in relatively large streams in the form of a coarse shower, thus is too heavy to be carried away by the current of air, as would be the case were the water passing through our cooling apparatus in the form of a fine spray.

Further, by providing inlets and outlets of substantial and equal cross section, a large volume of air may be forced through the said chambers without undue resistance.

In other words, the reservoir 2 being filled to the level shown in Fig. 1 from supply pipe 11, is recirculated by the action of pump 8 through pipe 4 to the condensing coils 10 which are to be cooled and then returns it through pipe 7 to the spreader pipe $m$ on the upper pan. The water flows over the pans in a thin sheet and a large portion falls through in small streams and is broken up into small splashes as it strikes the solid portion of the metal pan below. The surplus water which does not fall through the perforated portion of the pan cascades over the lower edge and falls to the next pan below. The next pan below being inclined in the opposite direction, the operation is repeated, thereby keeping the water in a constant turbulent motion and breaking it up into fine drops. The action of the fan $h$ takes cold outside air through inlet pipe $e$ and directs it through the lower passageways $b$ to the extended curved passageway $g$, which changes its direction 180 degrees and with the aid of the director plates $r$ and $q$ the air is distributed evenly through the passageways of the upper chamber $c$, and then discharged to the outside air through the outlet pipe $f$.

We claim:

1. An air and water cooling apparatus comprising the combination of a housing divided into upper and lower chambers, a series of perforated pans overlying one the other, dividing each chamber into horizontal air spaces means for introducing water on the upper pan, means projecting air into the lower chamber, air directing elements arranged to direct the air currents thru said spaces from the lower to the upper chamber, the air being allowed to escape from the upper chamber, said pans staggered so that the upper thereof will discharge on the lower, and said pans arranged at a slight incline and provided with flanges at their discharging ends, whereby to retard the flow of water over said pans and cause the sheet of water carried thereby to be maintained at a minimum depth notwithstanding the dropping of part of the water thru the perforations of the pans.

2. An air and water cooling apparatus comprising the combination of a housing divided into upper and lower chambers, a series of perforated pans overlying one the other, dividing each chamber into horizontal air spaces, means for introducing water on the upper pan, means projecting air into the lower chamber, air directing elements arranged to direct air currents thru said spaces from the lower to the upper chamber, the air being allowed to escape from the upper chamber, said pans arranged so that the upper thereof will discharge on the lower and will retard the flow of water over said pans and cause the sheet of water carried thereby to be maintained at a minimum depth notwithstanding the dropping of part of the water thru the perforations of the pans.

3. An air and water cooling apparatus comprising the combination of a housing divided into upper and lower chambers, a series of perforated pans overlying one the other, dividing each chamber into horizontal air spaces, means for introducing water on the upper pan, means projecting air into the lower chamber, air directing elements arranged to direct air currents thru said spaces from the lower to the upper chamber, the air being allowed to escape from the upper chamber, said pans arranged so that the upper thereof will discharge on the lower, and provided with flanges at their discharging ends, whereby to retard the flow of water over said pans and cause the sheet of water carried thereby to be maintained at a minimum depth notwithstanding the dropping of part of the water thru the perforations of the pans.

BENJAMIN F. MILLER.
FRED S. STARBARD.